(12) United States Patent
Bowers, III et al.

(10) Patent No.: US 10,151,767 B2
(45) Date of Patent: Dec. 11, 2018

(54) LASER STROBE TACHOMETER

(71) Applicant: Computational Systems Inc., Knoxville, TN (US)

(72) Inventors: Stewart V. Bowers, III, Knoxville, TN (US); Joseph C. Baldwin, Knoxville, TN (US); Thomas E. Nelson, Knoxville, TN (US)

( * ) Notice: Subject to any disclaimer, the term of this patent is extended or adjusted under 35 U.S.C. 154(b) by 76 days.

(21) Appl. No.: 15/426,097

(22) Filed: Feb. 7, 2017

(65) Prior Publication Data

US 2018/0224478 A1    Aug. 9, 2018

(51) Int. Cl.
*G01P 3/40*    (2006.01)

(52) U.S. Cl.
CPC ........................... *G01P 3/40* (2013.01)

(58) Field of Classification Search
CPC .......................................... G01P 3/40
See application file for complete search history.

(56) References Cited

U.S. PATENT DOCUMENTS

| | | | | |
|---|---|---|---|---|
| 4,326,804 A * | 4/1982 | Mossey | ................. | G01B 11/14 250/224 |
| 5,373,735 A * | 12/1994 | Gutman | .............. | G01M 13/021 33/501.07 |
| 2012/0041711 A1* | 2/2012 | Jacoby | .................... | G01P 3/488 702/151 |
| 2012/0283985 A1* | 11/2012 | Schubert | .................. | G01P 3/40 702/145 |
| 2015/0012247 A1* | 1/2015 | Bowers, III | ............ | G01N 29/46 702/189 |
| 2015/0185244 A1* | 7/2015 | Inoue | ....................... | G01P 3/68 356/5.09 |
| 2017/0261372 A1* | 9/2017 | Woolfson | ........... | H05B 33/0854 |

* cited by examiner

*Primary Examiner* — Lisa Caputo
*Assistant Examiner* — Herbert K Roberts
(74) *Attorney, Agent, or Firm* — Luedeka Neely Group, P.C.

(57) ABSTRACT

A laser strobe tachometer combines a strobe light with a laser speed sensor. The ability of the laser sensor to accurately determine machine speed enables a synchronous strobe rate to be determined without user intervention. Having locked onto the turning speed, the stroboscope can "freeze" the motion of the shaft, thereby allowing an operator to observe locations, such as on a keyway, flat or screw head, for the optimum placement of the laser spot to generate a once-per-revolution tachometer pulse.

20 Claims, 5 Drawing Sheets

LASER STROBE TACHOMETER

FIELD

This invention relates to the field of machine health measurements. More particularly, this invention relates to a laser tachometer that provides a strobe function for more accurate measurement of machine rotation speed.

BACKGROUND

Accurately detecting the speed of rotating equipment is critical for the measurement of vibration. A precise speed measurement is required to differentiate faults relating to the machine's synchronous running speed, such as imbalance and misalignment to sub-synchronous frequencies such as belt frequencies to those of non-synchronous frequencies, such as bearing faults and electrical frequencies. A precise phase reference is required to perform synchronous analysis and measure relative phase. While some machines are equipped with permanently mounted sensors that produce a tachometer pulse, others must be measured in-situ by an operator. For an accurate phase reference, both methods require an accurate detection of a feature on the rotating shaft that is exposed once per rotation. An in-situ measurement of speed can be performed using a contact tachometer, a stroboscope, a photo tachometer or other means, such as a CSI Model 430 speed sensor. All of these in-situ measurement devices have their disadvantages.

A contact tachometer performs a direct measurement involving physical contact with the surface or end of a rotating shaft. This requires the operator to be in close proximity to the machine.

A stroboscope flashes high-intensity light at a variable rate while the operator adjusts the flash rate to "freeze" the motion of the shaft to determine the operating speed. Some level of operator skill is necessary to interpret the illuminated scene correctly.

A photo tachometer uses light reflected from a special reflective tape attached to the shaft to create a once-per-revolution pulse. This requires the machine to be stopped to apply or clean the reflective tape.

The CSI Model 430 speed sensor uses reflected laser light to detect surface irregularities of a rotating part. Speed information is automatically extracted from the reflection signal by autocorrelation. This method does not require special tape or shaft preparation and the measurement can be made at quite some distance. However, in order to generate an accurate once-per-revolution (1×) tachometer pulse for phase reference, the laser beam must be precisely aimed at a unique once-per-revolution feature, such as a keyway, reflective tape, flat or set screw.

Often in an industrial environment, acquiring an accurate rotational speed measurement, and in particular acquiring an accurate phase measurement, requires both a tachometer and a strobe light. A tachometer pulse (such as produced from a laser tachometer) is generated when an object such as a keyway, reflective tape, or indention in the shaft is present. However, such protrusions in an otherwise smooth shaft are impossible to see with the naked eye when the machine is running, even under bright lights. Generally, the only way to find a mark on a rotating shaft is with a strobe light. With manual adjustments of the strobe flash rate, a speed can be determined, although no pulse can be generated for determining the phase relationship. However, by using the strobe to find distinct shaft perturbations, the laser can be used to precisely determine phase relationships.

What is needed, therefore, is a rotational speed detection device that combines the functions of a strobe light with the functions of a laser tachometer.

SUMMARY

The above and other needs are met by various embodiments of a laser strobe tachometer, which combines the benefits of the strobe light and laser speed sensor. The ability of the laser sensor to accurately determine machine speed enables a synchronous strobe rate to be determined without user intervention. Having locked onto the turning speed, the stroboscope can then "freeze" the motion of the shaft, thereby allowing the user to observe locations for optimum placement of the laser spot to generate a once-per-revolution tachometer pulse, such as on a keyway, flat or screw head.

FIG. 2 illustrates the signal output from a laser speed sensor detector in a situation in which the reflectance signal is sensing various shaft features but no triggerable 1× feature. FIG. 3 illustrates a situation in which a clear 1× signal is being produced from a reflective object. In this case, a trigger threshold voltage of 2V would generate a very good 1× phase reference pulse. Often the difference in laser beam placements that result in the signal of FIG. 2 versus the signal of FIG. 3 is only a fraction of an inch. Thus, the ability to observe the precise location of the 1× feature is crucial.

One preferred embodiment provides an apparatus for determining rotational speed of a rotating component of a machine. The apparatus of this embodiment includes a laser for generating a laser beam directed onto the rotating component of the machine and a first driver circuit for generating a modulated current that drives the laser. A detector generates a detector signal based on detection of laser light energy reflected from the rotating component of the machine. A demodulator generates a demodulated signal based on demodulation of the detector signal. A processor executes instructions that implement an algorithm to determine a rotational speed value based on the demodulated signal, wherein the rotational speed value is indicative of the rotational speed of the rotating component. One or more visible light sources generating visible light for illuminating the rotating component of the machine. A second driver circuit receives the rotational speed value and based thereon powers the one or more visible light sources on and off at a frequency related to the rotational speed value, thereby creating a visual strobe effect.

In some embodiments, the first driver circuit generates the modulated current having a modulation frequency that is greater than a filter cutoff frequency. In some embodiments, the filter cutoff frequency is about 100 kilohertz or greater.

In some embodiments, the apparatus includes a high-pass filter for filtering the detector signal to pass signal components having frequencies greater than the filter cutoff frequency.

In some embodiments, the algorithm implemented in the processor comprises an autocorrelation algorithm or a tachometer threshold detection algorithm.

In some embodiments, the rotational speed value is in a range of about 1 Hz to about 5 kHz.

In some embodiments, the one or more visible light sources comprise one or more light emitting diodes (LEDs).

In some embodiments, the one or more visible light sources are concentrically arranged around the laser.

In some embodiments, the apparatus includes an output interface for outputting the rotational speed value in TTL format to a machine vibration analyzer. In some embodiments, the apparatus includes a wireless module for outputting the rotational speed value.

In some embodiments, the apparatus includes a user input device that is in electrical communication with the second driver circuit. The user input device is for adjusting the phase of a modulated current that drives the visible light sources. This phase adjustment allows for rolling forward or backward a visual image of the rotating component as perceived by the user to allow the user to visually inspect a certain portion of the rotating component that would not be visible otherwise.

In some embodiments, the visible light sources include one or more first light sources having a first angular field of illumination and one or more second light sources having a second angular field of illumination, where the first angular field of illumination is less than the second angular field of illumination. The second driver circuit of these embodiments is operable to apply power to the visible light sources in multiple selectable combinations, including:

- a first combination in which all of the first light sources are activated and none of the second light sources are activated;
- a second combination in which all of the second light sources are activated and none of the first light sources are activated; and
- a third combination in one or more of the first light sources are activated and one or more of the second light sources are activated.

In these embodiments, a user input device is in electrical communication with the second driver circuit. The user input device is used to select either the first, second or third combinations of visible light sources.

In some embodiments, the second driver circuit is operable to drive the visible light sources in at least two different modes, including:

- a strobe mode in which the second driver circuit powers the visible light sources on and off to create the visual strobe effect; and
- a flashlight mode in which the second driver circuit powers on the visible light sources continuously to provide constant illumination.

In these embodiments, a user input device is in electrical communication with the second driver circuit. The user input device is used to select the strobe mode or the flashlight mode.

In another aspect, the invention provides an apparatus for determining rotational speed of a rotating component of a machine. In a preferred embodiment, the apparatus includes a portable handheld housing, a laser disposed within the handheld housing, and a plurality of light emitting diodes (LEDs) disposed in or on the housing in a concentric arrangement around the laser. The laser generates a laser beam directed onto the rotating component of the machine, and a processor determines a rotational speed value based on detection of laser light energy reflected from the rotating component of the machine. The LEDs, which generate visible light that illuminates the rotating component of the machine, are powered on and off at a frequency related to the rotational speed value, thereby creating a visual strobe effect.

In yet another aspect, the invention provides a method for determining rotational speed of a rotating component of a machine. A preferred embodiment of the method includes the following steps:

(a) directing a laser beam from a laser onto the rotating component of the machine;
(b) driving the laser with a modulated current;
(c) detecting laser light energy reflected from the rotating component of the machine and generating a detector signal based thereon;
(d) demodulating the detector signal and generating a demodulated signal based thereon;
(e) determining a rotational speed value based on the demodulated signal, wherein the rotational speed value is indicative of the rotational speed of the rotating component;
(f) generating visible light that illuminates the rotating component of the machine; and
(g) strobing the visible light on and off at a frequency related to the rotational speed value, thereby creating a visual strobe effect.

In some embodiments, step (e) of the method comprises:

(e1) calculating an autocorrelation waveform based on the demodulated signal;
(e2) performing a Fast Fourier Transform (FFT) of the autocorrelation waveform to generate a frequency spectrum that includes a series of harmonic peaks having a fundamental frequency; and
(e3) determining the rotational speed based on the fundamental frequency of the series of harmonic peaks.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

To combine an LED strobe function with a laser tachometer function, preferred embodiments described herein use a modulation/demodulation scheme to isolate the strobe energy from the laser energy. A side benefit of this approach is that ambient light rejection is much improved.

Figure 1:
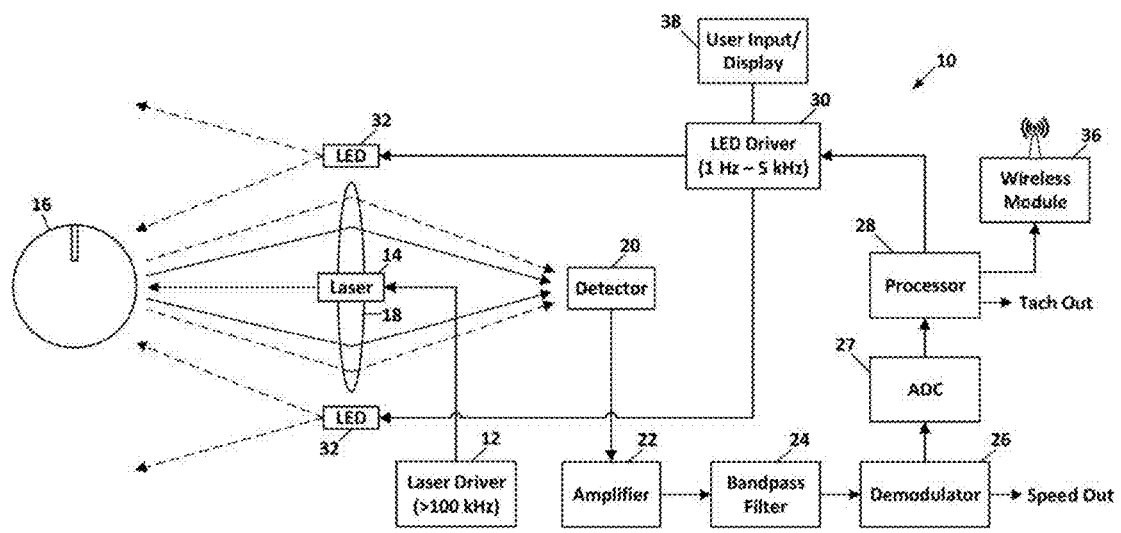
FIG. 1 depicts a laser strobe tachometer system according to an embodiment of the invention.
Figure 2:
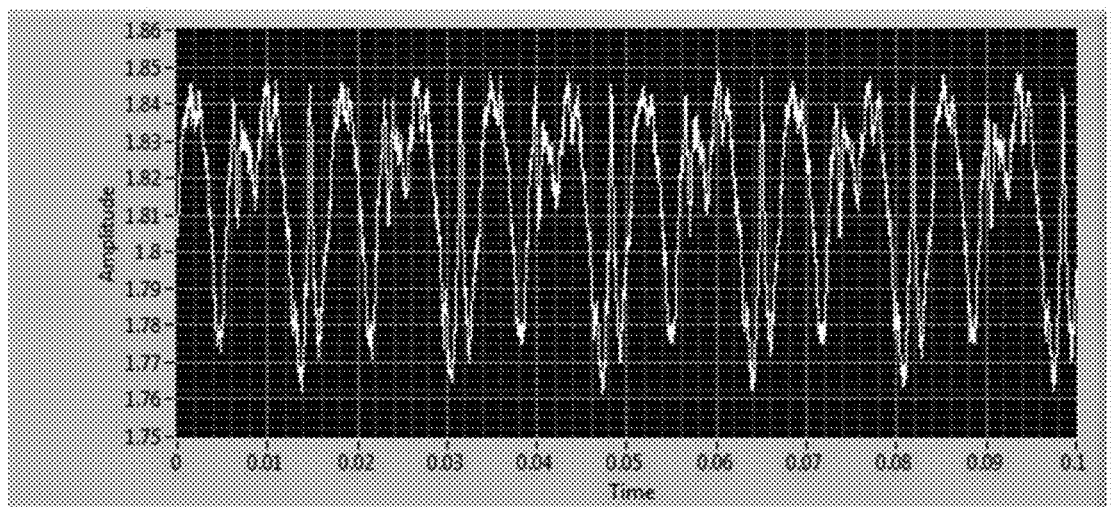
FIG. 2 depicts an exemplary signal output from a laser speed sensor detector in a situation in which various shaft features but no triggerable once-per-revolution feature is detected.
Figure 3:
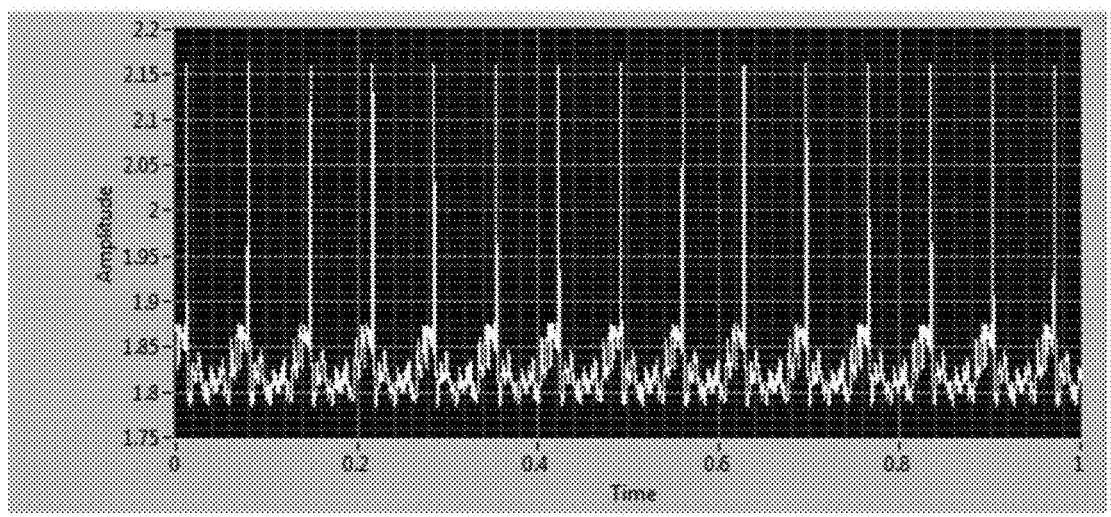
FIG. 3 depicts an exemplary signal output from a laser speed sensor detector in a situation in which a clear once-per-revolution signal is being produced from a reflective object.
Figure 5:
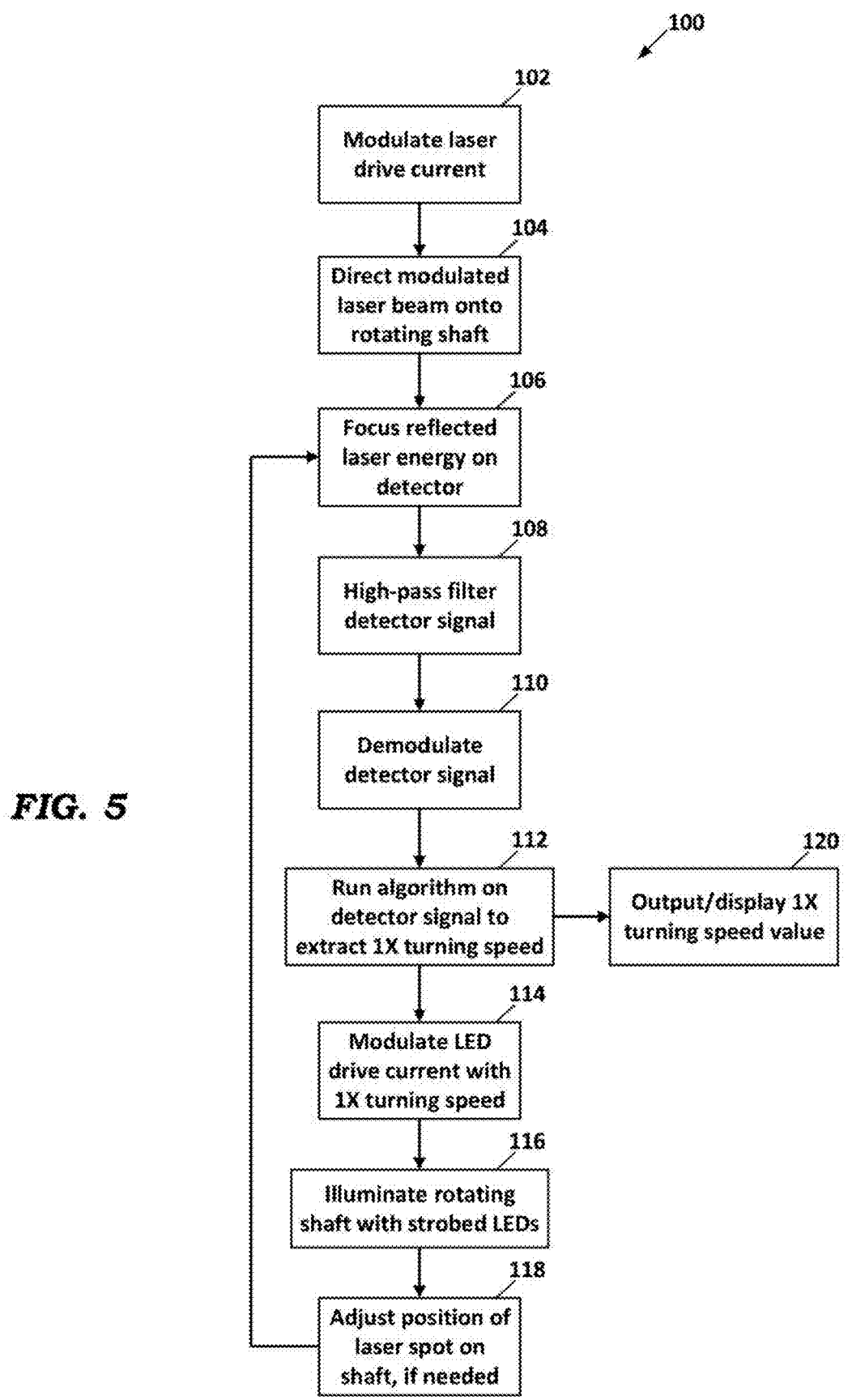
FIG. 5 depicts a method for using a laser strobe tachometer according to a preferred embodiment.

A functional block diagram of a preferred embodiment of a laser strobe tachometer 10 is depicted in FIG. 1. Steps of a method 100 for using the laser tachometer of FIG. 1 are depicted in FIG. 5. A laser driver circuit 12 modulates the drive current to a laser 14 (step 102). In one preferred embodiment, the laser 14 operates at a wavelength of 650 nm (red) at a power level of about 5 mW. The laser 14 directs a narrow laser beam onto a rotating machine shaft 16 (step 104), and laser reflection from the shaft is focused by a lens 18 onto a detector 20 (step 106). The detector signal is amplified by an amplifier 22, filtered by a band-pass filter 24 centered at the modulation frequency to remove any ambient and strobe light energy captured by the detector 20 (step 108). The amplified and filtered detector signal is provided to a synchronous demodulator 26 to create a reflection waveform (step 110). The reflection waveform may be provided as a raw speed waveform to an external measurement device, such as the CSI Model 2140, or it may be converted by the ADC 27 into a digital signal. In a preferred embodiment, the ADC 27 is a sigma-delta convertor with a dynamic range exceeding 90 dB and a sample rate exceeding 100 kHz.

A processor 28 receives the demodulated reflection waveform and runs an autocorrelation algorithm and/or a tachometer threshold detection algorithm to extract a 1× turning speed, which will generally be in a range of 1 Hz to 5 kHz (step 112). In a preferred embodiment, the 1× turning speed is determined by first calculating the autocorrelation of the demodulated reflection waveform generated from the laser output. The autocorrelation spectrum includes a family of harmonic peaks and the fundamental frequency of this family of harmonic peaks corresponds to the 1× turning speed of the machine being analyzed.

In an alternative embodiment, detection of the turning speed is accomplished using an algorithm described in U.S. patent application Ser. No. 14/296,480 titled "Automatic Threshold Detection for Tachometer Signals" (publication number US2014/0372071), the entire contents of which are incorporated herein by reference. This algorithm is based on taking the derivative of the laser waveform. The output of the algorithm produces a positive pulsing waveform in which the width between the pulses is the running speed of the machine being analyzed.

The 1× turning speed signal is provided to an LED driver 30, which modulates one or more strobe LEDs 32 at the rate of the turning speed signal (step 114). The strobe light from the LEDs is directed onto the rotating shaft to "freeze" the shaft feature (i.e., keyway) that is turning at the 1× speed (step 116). The laser beam can then be adjusted, if necessary, to put the beam spot directly on the keyway or other feature (step 118).

In a preferred embodiment, as long as the laser spot is maintained on the rotating shaft, steps 106-116 are performed continuously, and a turning speed value is continuously or periodically output from the laser strobe tachometer 10 to an external vibration analyzer, such as the CSI Model 2140 (step 120). In some embodiments discussed below, the turning speed value may also be displayed on a user input/display device 38, such as a touch screen, that is integrated into the housing of the laser strobe tachometer 10.

The modulation of the laser 14 at more than 100 kHz and the bandpass filtering of the detector signal prevents any of the lower frequency LED strobe energy from appearing in the reflection waveform from the demodulator 26. The laser modulation frequency is not critical so long as it is at least about an order of magnitude greater than the highest LED strobe rate.

As described above, the preferred embodiment determines the turning speed from the laser signal, and then pulses a strobe light based on the turning speed to find a keyway or other distinctive once-per-revolution feature on the machine shaft to determine a phase. In an alternative embodiment, strobe light pulses are first generated at a frequency that approximates the machine shaft turning speed. With the strobe light illuminating the machine shaft, a keyway or once-per-revolution marker can then be located, although it may appear to be slowly rotating, not "frozen."

Once the area of the shaft containing the once-per-revolution marker is known, the laser is pointed to this area and the process proceeds as in the preferred embodiment.

Figure 4:
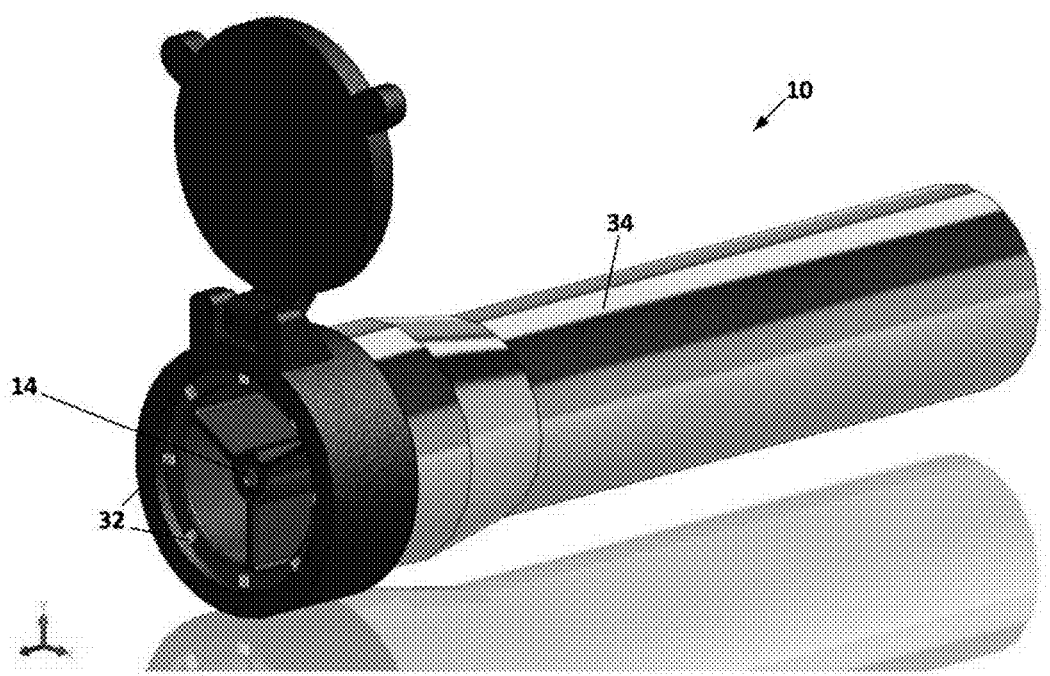
FIG. 4 depicts the physical configuration of a handheld laser strobe tachometer according to a preferred embodiment.

In one preferred embodiment as depicted in FIG. 4, the laser strobe unit 10 has a physical form factor similar to that of a CSI Model 430 speed sensor that has been augmented with multiple LEDs in a flashlight-style housing 34. This embodiment preferably includes internal microprocessor and driver circuitry to provide the stroboscope illumination. In this configuration, power is provided by an external vibration analyzer, such as the CSI Model 2140, to which the strobe unit is connected via a power/signal cable.

In another embodiment, the laser strobe unit 10 is a stand-alone device with its own power supply and user input/display device 38. In this embodiment, a tachometer pulse output provides speed and phase reference information, such as in TTL signal format, for use by a vibration analyzer.

In some embodiments, the laser strobe tachometer 10 includes a wireless communication module 36, such as Bluetooth or Wi-Fi module, to wirelessly communicate speed and phase reference information to a vibration analyzer.

In some embodiments, the user input/display device 38 allows the user to adjust the phase of the strobe output from the LED driver 30 so that the user can visually "roll" the rotor image position forward or backward to inspect a certain sector of a shaft or fan blade. In some embodiments, this function is provided by software running on the processor 28, which adjusts the phase of the 1× turning speed signal provided to the LED driver 30.

In some embodiments, the width of the strobe beam can be adjusted by using a combination of narrow and wide angle LEDs. In these embodiments, one or more of the LEDs 32 have narrower fields of illumination and one or more of the LEDs 32 have wider fields of illumination. Either through operation of the user input/display device 38 or software running on the processor 28, the user can select the wide angle LEDs or the narrow angle LEDs or both to achieve the desired illumination.

In some embodiments, the LEDs 32 may be operated in a "flashlight" mode to provide steady-state illumination. This mode may be selected using either the user input/display device 38 or software running on the processor 28.

Figure 6:
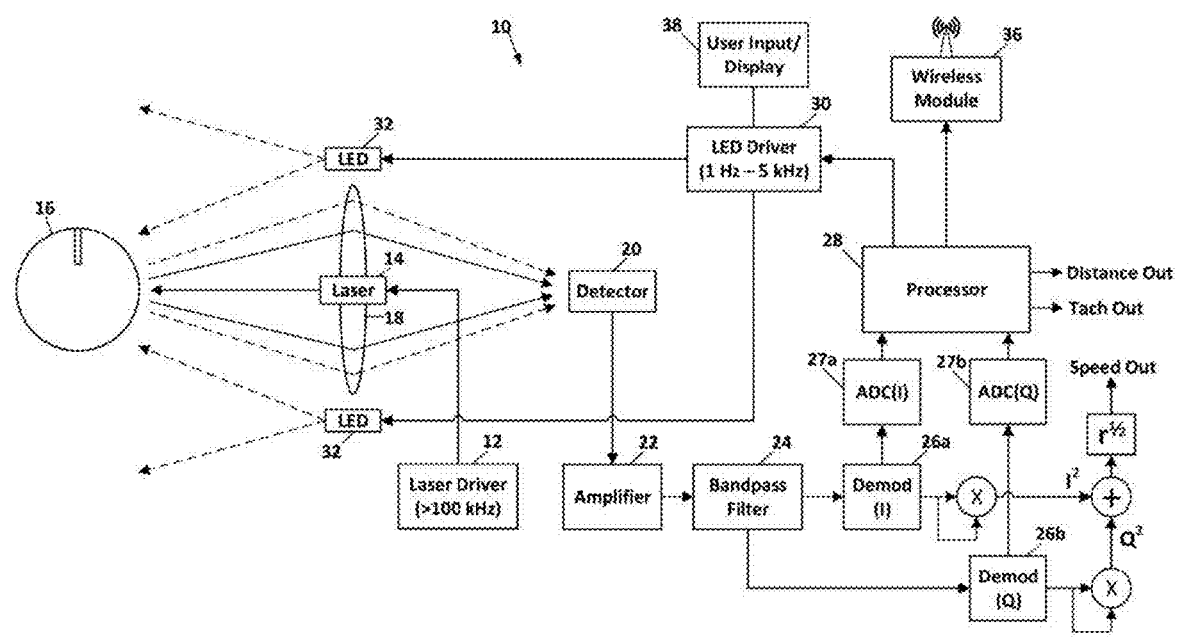
FIG. 6 depicts a laser strobe tachometer system according to an alternative embodiment of the invention.

In an alternative embodiment depicted in FIG. 6, the single demodulator 26 (FIG. 1) is implemented as dual demodulator having an in-phase (I) output 26a and a quadrature (Q) output 26b to allow determination of distance and speed information. In this embodiment, the modulation frequency is on the order of 3 MHz to 10 MHz. This embodiment preferably has a two-channel ADC, including an ADC channel 27a for the in-phase information and an ADC channel 27b for the quadrature information.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for determining rotational speed of a rotating component of a machine, the apparatus comprising:
   a laser for generating a laser beam directed onto the rotating component of the machine;
   a first driver circuit for generating a modulated current that drives the laser;
   a detector for generating a detector signal based on detection of laser light energy reflected from the rotating component of the machine;
   a demodulator for generating a demodulated signal based on demodulation of the detector signal;
   a processor operable to execute instructions that implement an algorithm to determine a rotational speed value based on the demodulated signal, wherein the rotational speed value is indicative of the rotational speed of the rotating component;
   one or more visible light sources for generating visible light for illuminating the rotating component of the machine, the one or more visible light sources including:
      one or more first light sources having a first angular field of illumination; and
      one or more second light sources having a second angular field of illumination,
      wherein the first angular field of illumination is less than the second angular field of illumination;
   a second driver circuit for receiving the rotational speed value and based thereon powering the one or more visible light sources on and off at a frequency related to the rotational speed value, thereby creating a visual strobe effect, the second driver circuit operable to apply power to the one or more visible light sources in multiple selectable combinations, including one or more of:
      a first combination in which all of the first light sources are activated and none of the second light sources are activated;
      a second combination in which all of the second light sources are activated and none of the first light sources are activated; and
      a third combination in one or more of the first light sources are activated and one or more of the second light sources are activated; and
   a user input device in electrical communication with the second driver circuit, the user input device for use in selecting one of the first, second or third combinations of visible light sources.

2. The apparatus of claim 1 wherein the first driver circuit generates the modulated current that is modulated at a frequency that is greater than a filter cutoff frequency.

3. The apparatus of claim 2 wherein the filter cutoff frequency is about 100 kilohertz or greater.

4. The apparatus of claim 2 further comprising a bandpass filter for filtering the detector signal to pass signal components having frequencies in a passband ranging below and above the modulation frequency.

5. The apparatus of claim 1 wherein the algorithm implemented in the processor comprises an autocorrelation algorithm or a tachometer threshold detection algorithm.

6. The apparatus of claim 1 wherein the demodulator includes an in-phase (I) demodulator signal output and a quadrature (Q) demodulator signal output.

7. The apparatus of claim 6 wherein the processor executes instructions to determine a distance value based on in-phase and quadrature demodulated signals, wherein the distance value indicates a distance to the rotating component of the machine.

8. The apparatus of claim 7 wherein the first driver circuit generates the modulated current that is modulated at a frequency of about 3 MHz to about 10 MHz.

9. The apparatus of claim 1 wherein the rotational speed value is in a range of about 1 Hz to about 5 kHz.

10. The apparatus of claim 1 wherein the one or more visible light sources comprise one or more light emitting diodes (LEDs).

11. The apparatus of claim 1 wherein the one or more visible light sources are concentrically arranged around the laser.

12. The apparatus of claim 1 further comprising an output interface for outputting the rotational speed value to a machine vibration analyzer.

13. The apparatus of claim 1 further comprising a wireless module for outputting the rotational speed value.

14. The apparatus of claim 1 wherein the user input device is further for use in adjusting phase of a modulated current that drives the one or more visible light sources, wherein the phase adjustment allows for rolling forward or backward a visual image of the rotating component as perceived by the user to allow the user to visually inspect a certain portion of the rotating component.

15. The apparatus of claim 1 further comprising:
   the second driver circuit operable to drive the one or more visible light sources in at least two different modes including:
      a strobe mode in which the second driver circuit powers the one or more visible light sources on and off to create the visual strobe effect; and
      a flashlight mode in which the second driver circuit powers on the one or more of the visible light sources continuously to provide constant illumination; and
   the user input device for use in selecting the strobe mode or the flashlight mode.

16. An apparatus for determining rotational speed of a rotating component of a machine, the apparatus comprising:
   a portable handheld housing;
   a laser speed sensor disposed within the handheld housing, the laser speed sensor comprising:
      a laser for generating a laser beam directed onto the rotating component of the machine;
      a processor for determining a rotational speed value based on detection of laser light energy reflected from the rotating component of the machine;
   a plurality of light emitting diodes (LEDs) disposed in or on the housing in a concentric arrangement around the laser, the plurality of LEDs operable to generate visible light to illuminate the rotating component of the machine, the plurality of LEDs powered on and off at a frequency related to the rotational speed value, thereby creating a visual strobe effect, the plurality of LEDs including:
      one or more first LEDs having a first angular field of illumination; and
      one or more second LEDs having a second angular field of illumination,
      wherein the first angular field of illumination is less than the second angular field of illumination;
   a driver circuit operable to drive the plurality of LEDs in multiple selectable combinations, including one or more of:
      a first combination in which all of the first LEDs are activated and none of the second LEDs are activated;

a second combination in which all of the second LEDs are activated and none of the first LEDs are activated; and
a third combination in one or more of the first LEDs are activated and one or more of the second LEDs are activated; and
a user input device in electrical communication with the driver circuit, the user input device for use in selecting one of the first, second or third combinations of LEDs.

17. The apparatus of claim 16 further comprising an output interface for outputting the rotational speed value to a machine vibration analyzer.

18. The apparatus of claim 16 further comprising a wireless module for outputting the rotational speed value.

19. The apparatus of claim 16 wherein:
the driver circuit is for receiving the rotational speed value and based thereon powering the plurality of LEDs on and off at the frequency related to the rotational speed value; and
the user input device is disposed in or on the housing, the user input device for use in adjusting phase of a modulated current that drives the plurality of LEDs, wherein the phase adjustment allows for rolling forward or backward a visual image of the rotating component as perceived by a user, thereby allowing the user to visually inspect a certain portion of the rotating component.

20. The apparatus of claim 16 wherein:
the driver circuit is operable to drive the plurality of LEDs in at least two different modes including:
a strobe mode in which the driver circuit powers the plurality of LEDs on and off to create the visual strobe effect; and
a flashlight mode in which the driver circuit powers on the plurality of LEDs continuously to provide constant illumination; and
the user input device is for use in selecting the strobe mode or the flashlight mode.

* * * * *